June 9, 1964   T. SLONCZEWSKI   3,136,956
OSCILLATOR FREQUENCY CONTROL BY PHASE NULL DETECTION
Filed Sept. 29, 1961

INVENTOR
T. SLONCZEWSKI
BY
ATTORNEY

June 9, 1964  T. SLONCZEWSKI  3,136,956
OSCILLATOR FREQUENCY CONTROL BY PHASE NULL DETECTION
Filed Sept. 29, 1961  2 Sheets-Sheet 2

INVENTOR
T. SLONCZEWSKI
BY
ATTORNEY

United States Patent Office 3,136,956
Patented June 9, 1964

3,136,956
OSCILLATOR FREQUENCY CONTROL BY
PHASE NULL DETECTION
Thaddeus Slonczewski, Summit, N.J., assignor to Bell
Telephone Laboratories, Incorporated, New York,
N.Y., a corporation of New York
Filed Sept. 29, 1961, Ser. No. 141,651
2 Claims. (Cl. 331—14)

This invention relates to frequency control of variable frequency oscillatory phenomena and more particularly to frequency control of oscillators intended to provide an output with a frequency continuously varying with respect to time in a predetermined manner, for example, linearly.

For many laboratory testing and measuring purposes, it is desirable to use as an energy source a voltage, current, or electromagnetic energy wave whose frequency varies rapidly and accurately according to a predetermined function of time. Such a source probably would be useful in a number of other applications, such as signaling and communications systems. In the testing and measuring applications it is generally desired to obtain a representation of some characteristic of a device at different frequencies, preferably as frequency is varied continuously. For instance, in fault location in submarine cable systems, such a representation allows quick and accurate determination of a location of a faulty repeater in the cable system. As it frequently is necessary to cover very wide frequency ranges in making such measurements, it is impractical to vary the frequency in small steps and to hold it constant for some time at each step. This takes too much time. Much more rapid measurements are possible if the frequency is varied continuously.

On the other hand, heretofore it has been easier to obtain high accuracy in the production of desired frequencies when the frequency is varied stepwise than when it has been varied continuously. For, when the frequency is varied stepwise, the controlled frequency can be synchronized with a standard constant frequency source, a process which is commonly called phase null detection. This phase null detection can be done much more rapidly than actual frequency measurement. Heretofore when the frequency has been varied continuously, it has been thought necessary to use some means of actual frequency measurement, such as the resonance-sensing means used in my prior United States Patent 2,732,496 issued January 24, 1956. When frequency is actually measured, the error-sensing means requires several cycles of the controlled output in order to detect the existence of an error. Thus the information derived is obsolete by the time it is sensed, especially if the frequency and rate of change of frequency are both high. The advantage of a more rapid means of error sensing is readily apparent. The use of phase null detection would provide that needed speed.

It is an object of this invention to sense frequency deviations of an oscillatory wave from a given variation of frequency with time by sensing the phase of the oscillatory wave relative to the phase of a constant frequency wave.

It is a further object of this invention to produce an oscillatory wave with a frequency which varies linearly with respect to time by scheduling an approximately linear variation of frequency with time, intermittently comparing the phase of the oscillatory wave and the phase of a constant frequency wave and applying the phase difference to correct the frequency variation of the oscillatory wave to the desired linear variation with time.

In accordance with the invention it has been recognized that, at least for waves with frequencies which vary according to a linear function of time, conditions of like phase recur at times which are separated by equal time intervals. The reciprocal of the square of these equal time intervals is equal to the desired rate of change of frequency, as will be shown in Equation 15 below. Since the reciprocal of a time interval is frequency, the sampling frequency is equal to the square root of the desired rate of change of frequency. Therefore, if the variable frequency wave is sampled at times separated by time intervals equal to those just mentioned, like phase conditions will be observed each time if the frequency variation has been continuously correct; but, if the frequency variation has been only approximately correct and its deviations from the desired frequency variation have not tended to cancel each other within one testing interval, deviations from a reference phase condition will be observed. Since phase means the degree of progress of a wave through any one of a number of cycles of amplitude variation with respect to a reference amplitude value associated with the wave, the preferred embodiments of the invention operate by sensing, at times separated by the predicted equal time intervals, amplitude deviations of the variable frequency wave from a reference amplitude value.

In the basic embodiment of the invention, the result of this intermittent amplitude sensing, which is known in the art as phase null detection, is applied to a servo control which changes the frequency of the oscillatory wave to eliminate the sensed amplitude deviation and thus to eliminate the frequency deviation from the desired variation of frequency with time, so long as the frequency deviation has caused a phase deviation which is less than one-half cycle of the oscillation during each testing period. In a more complex embodiment of the invention, the controlled oscillatory wave is first modulated with a constant frequency wave and its harmonics before the intermittent amplitude sensing is performed. By allowing only the lowest difference frequency to pass to the phase null detector, large ranges of frequency variation are broken into smaller segments for the purpose of error sensing, each containing the same amount of frequency change, with the result that phase deviations greater than one-half cycle of the controlled wave may be corrected since the deviation will appear to be a phase deviation of less than one-half cycle of the lowest difference frequency wave.

The nature of the present invention and the advantages of the various embodiments thereof will become more apparent from a consideration of the following detailed description and drawings.

Figure 1:
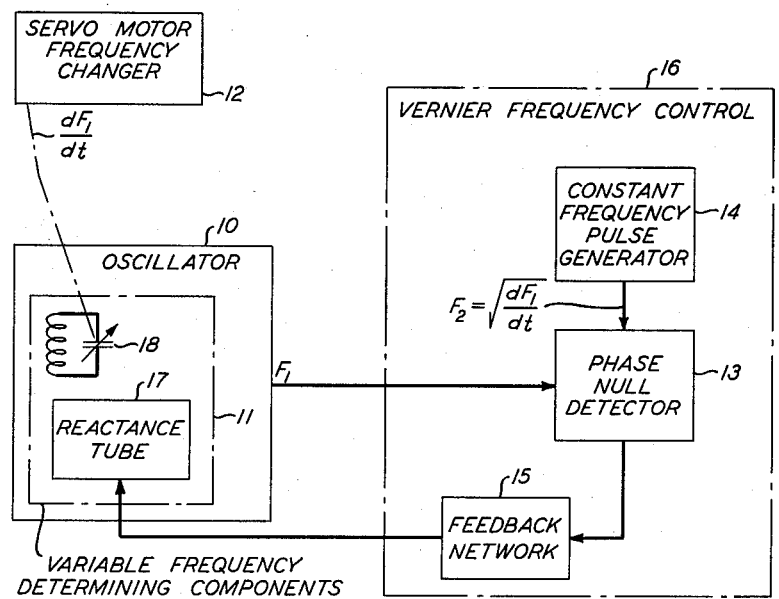
FIG. 1 is a block diagrammatic illustration of the components of a servo control system in accordance with the basic embodiment of the invention.

In FIG. 1 variable frequency oscillator 10 may be of any known type for operation at any frequency level since the feedback necessary to produce oscillation is quite independent of the servo control system with which the invention is concerned. Oscillator 10 will, of course, contain one or more frequency determining components 11 whose condition or orientation may be changed in order to change the frequency of oscillation. These frequency determining components need not be of the same general type; for instance, some may be capacitors or inductors whose configuration is varied by means of the rotation of an electric servo motor, and others may be reactance tubes, as is frequently the case for vernier-type adjustments, or any one of a number of other types. Frequency scheduler or changer 12 is merely a device which is programmed or scheduled to vary the condition of one or more of frequency determining components 11 in a way that will give a good approximation of the desired variation of frequency with time without the assistance of a feedback control system. In order to produce a linear variation of frequency with time, scheduler 12 is adjusted in accordance with the mathematical principle taught by the present invention so that the actual rate of change of frequency is approximately equal to the desired rate of change of frequency so that the phase deviation in any one sampling interval is less than one-half cycle of oscillation. The proper sampling frequency is obtained by adjusting the frequency of pulse generator 14 to be equal to the square root of the desired rate of change of frequency. Then, the remaining adjustment of frequency can be done by a feedback control system typical of phase null detection systems. For instance, frequency changer 12 may be a servo motor whose rotation turns a variable capacitor 18 whose shaping is a direct function of the desired frequency variation. However, it is not necessary to have moving parts in order to perform the function of frequency changer 12. For example, a capacitance-resistance discharge circuit controlling a reactance tube might perform that function. If several oscillators are ganged together so that each covers a different part of the overall frequency range, frequency changer 12 must shift from one to the next smoothly. Means for accomplishing this task are well within the ability of one skilled in the art. For instance, capacitors in the different oscillators may be driven from a common motor driven shaft so that when one can rotate no farther the next begins to rotate.

The output of oscillator 10 is applied to a phase null detector 13 which may be any one of a number of circuits commonly known as coincidence gates or time selection circuits. The constant frequency pulse generator 14 induces a transmission condition of phase null detector 13 each time a pulse occurs. These pulses are one way of providing the intermittent phase sampling which is a characteristic of the invention. They may be derived from some other constant frequency wave.

Actuator or feedback network 15 is an electrical connection from the output of phase null detector 13 to the grid of a reactance tube 17 among frequency determining components 11. Alternatively, it may include amplifiers and other electrical or mechanical devices designed to vary the condition of one or more of frequency determining components 11. In particular, feedback network 15 may include an integrating network in order to give more complete elimination of the errors which are sensed. Persons skilled in the automatic control art can easily devise other ways of manipulating the error signal to increase the speed and completeness of error elimination. It should be noted that feedback network 15 need not act upon the same components as frequency changer 12, but, on the other hand, it may act upon the same components if so desired.

Figure 2:
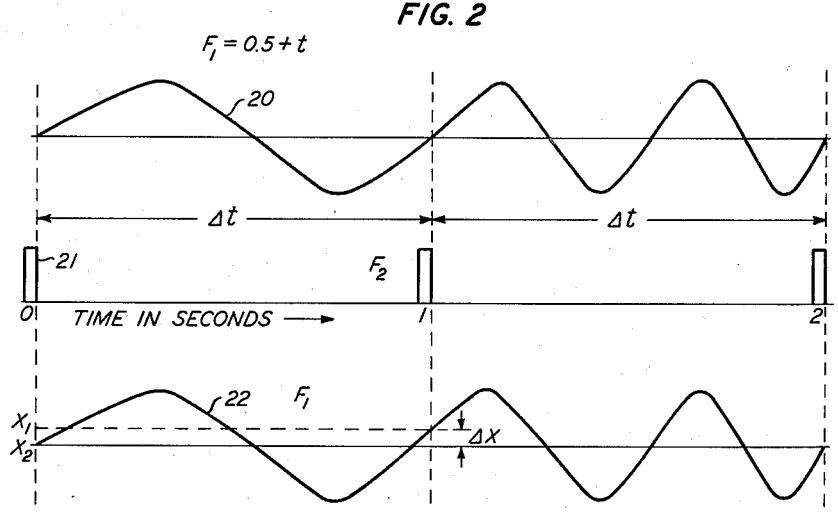
FIG. 2 shows curves which are useful in explaining the theory and operation of the invention.

In operation, the continuous variation of frequency of oscillator 10 will produce at least one complete cycle of oscillation between pulses of the constant frequency pulse generator 14. FIG. 2 illustrates this operation for the polynomial variation, $F_1 = 0.5 + t$. Curve 20 shows the oscillatory wave of variable frequency $F_1$ produced by variable frequency oscillator 10. Curve 21 shows the pulses of a constant frequency $F_2$ equal to one cycle per second produced by constant frequency pulse generator 14. Curves 20 and 21 show that, if the scheduling by frequency changer 12 is precisely correct, phase nulls of the oscillatory wave, curve 20, do occur at times separated by equal time intervals, $\Delta t$, which curve 21 indicates to be one second for this particular case.

More generally, mathematical analysis shows not only the existence of, but predicts the length of the equal time intervals at which conditions of like phase recur in a wave whose frequency is varying according to a polynomial function of time. That mathematics, for a linear variation of frequency with time, is as follows:

$$F_1 = a_1 + a_2 t \tag{1}$$

where $F_1$ is the frequency of the desired wave and the "$a$'s" are constants.

$$\theta = \int_0^t F_1 \, dt = a_0 + a_1 t + \frac{a_2 t^2}{2} \tag{2}$$

where $\theta$ is the phase angle of the desired wave. Now, if the desired wave has any number of phase nulls greater than 2 which are equally separated in time, the time intervals, $\Delta t$, at which they occur may be found. The wave must satisfy the condition at successive intervals, $\Delta t$, that its phase angle, $\theta$, progresses through an integral number of cycles during each such interval. If $F_1$ is given above in cycles per second and $t$ in seconds, then $\theta$ will be in cycles. At the first such time interval, $\Delta t_1$, after any arbitrary time, $t$:

$$\theta_1 = a_0 + a_1(t + \Delta t_1) + \frac{a_2}{2}[t^2 + 2t\Delta t_1 + (\Delta t_1)^2] \tag{3}$$

or:

$$\theta_1 = a_0 + a_1 t + a_1 \Delta t_1 + \frac{a_2}{2} t^2 + a_2 t \Delta t_1 + \frac{a_2 (\Delta t_1)^2}{2} \tag{4}$$

Subtracting (2) from (4) to get the number of cycles elapsed in the first time interval, $\Delta t_1$, will give the following equation:

$$\theta_1 - \theta = a_1 \Delta t_1 + a_2 t \Delta t_1 + \frac{a_2 (\Delta t_1)^2}{2} \tag{5}$$

The quantity $\theta_1 - \theta$ is to be required to be an integer. Therefore, the following condition is imposed:

$$a_1 \Delta t_1 + a_2 t \Delta t_1 + \frac{a_2 (\Delta t_1)^2}{2} = n_1, \tag{6}$$

where $n_1 = +1, +2, +3 \ldots$.

After the lapse of another time interval, $\Delta t_2$, which is equal to $\Delta t_1$:

$$\theta_2 = a_0 + a_1(t + 2\Delta t_1) + \frac{a_2}{2}[t^2 + 4t\Delta t_1 + 4(\Delta t_1)^2] \tag{7}$$

or:

$$\theta_2 = a_0 + a_1 t + 2a_1 \Delta t_1 + \frac{a_2}{2} t^2 + 2a_2 t \Delta t_1 + 2a_2 (\Delta t_1)^2 \tag{8}$$

Subtracting (4) from (8) will show the number of cycles elapsed in the second time interval, $\Delta t_2$, as follows:

$$\theta_2 - \theta_1 = a_1 \Delta t_1 + a_2 t \Delta t_1 + \frac{3}{2} a_2 (\Delta t_1)^2 \tag{9}$$

This quantity is also to be required to be an integer, although it will be a different integer from $n_1$ if the frequency of the oscillatory wave is continuously varying. Therefore, the following condition is imposed:

$$a_1 \Delta t_1 + a_2 t \Delta t_1 + 3/2 \, a_2 (\Delta t_1)^2 = n_2 \tag{10}$$

where $n_2 = +1, +2, +3 \ldots$.

Now, since $n_2$ and $n_1$ are both integers, it follows as a necessary consequence:

$$n_2 - n_1 = a_2 (\Delta t_1)^2 = n_3 \tag{11}$$

where $n_3 = +1, +2, +3 \ldots$.

Thus, the equal time intervals which were sought do exist and are equal to the following:

$$\Delta t = \Delta t_1 = \Delta t_2 = \sqrt{\frac{n_3}{a_2}} \tag{12}$$

The shortest equal time separations of phase null points on the variable frequency wave occur for $n_3=1$.

$$\text{Smallest } \Delta t = \sqrt{\frac{1}{a_2}} \qquad (13)$$

From the original expression for the frequency:

$$a_2 = \frac{dF_1}{dt} \qquad (14)$$

Therefore, $$\text{smallest } \Delta t = \sqrt{\frac{1}{\frac{dF_1}{dt}}} \qquad (15)$$

For $F_1 = 0.5 + t$, as in curve 20 of FIG. 2, $$\text{smallest } \Delta t = \sqrt{\frac{1}{1}} = 1 \text{ second}$$

Investigation of higher order polynomial variations of frequency with time leads to the conclusion that, for $f = a_1 + a_2 t + \ldots + a_{n+1} t^n$ $$\text{smallest } \Delta t = n+1 \sqrt{\frac{1}{\frac{d^n f}{dt^n}}} \qquad (16)$$

where the coefficients are interrelated according to arbitrary integers. From Equation 6, it may be seen that no necessary limitations are placed on $a_1$, which is the starting frequency, since the starting time $t$ of synchronization was stated to be arbitrary. In operation, for any arbitrary $a_1$, a brief transient slippage between the controlled and controlling waves will occur until a proper starting point for synchronization is obtained. If, however, synchronization is to begin immediately at zero time, that is at $t=0$, then $a_1$ must be one of a limitless number of discrete values determined by the value of the integer, $n_1$. Equation 6 must merely be solved for $a_1$ with $t$ equal to zero. Such a choice of the starting frequency $a_1$ in no way affects the use of the shortest time intervals, since $n_2$ can always be one integer larger than $n_1$; it merely gives an immediate start of the effective synchronization. Curve 20 illustrates such a case. Equation 6 shows $a_1$ is 0.5 cycle per second for an immediate start of effective synchronization for $\Delta t = 1$ second and $n_1 = 1$.

Synchronization is shown for purposes of illustration as occurring on the ascending slopes of curves 20 and 22 in FIG. 2. If the output frequency is approximately correct but deviates as shown in curve 22 of FIG. 2 from that for which the servo control is designed so that a phase error of less than one-half cycle of oscillation occurs within that testing period, then the amplitude $X_1$ of the output is not equal to the reference amplitude $X_2$ at the instant the pulse occurs and the polarity of the difference, $\Delta X = X_1 - X_2$, between the output and the reference amplitude is such that feedback network 15 will cause the frequency of oscillator 10 to be decreased so that at the occurrence of the next pulse the phase of the wave is not so far advanced as it otherwise would have been. Curve 22 shows a complete elimination of phase error by the time of occurrence of the next pulse at $t=2$ seconds. For a $\Delta X$ of the opposite polarity to that shown by curve 22, the frequency of oscillator 10 would be increased.

If synchronization on the descending slopes of the controlled oscillatory wave is desired the relationship between the polarity of phase error and the direction of frequency correction should be reversed.

It should be further noted that, although it is conventional and convenient to take zero phase to be at the middle or "zero" voltage, $X_2$, of the oscillatory wave, any arbitrary point of such a wave might be taken as a point of zero phase. Thus, the invention is not limited to detecting "zero" voltages of a controlled wave. The controlled wave might be synchronized at points at any level in its amplitude characteristic. It is only necessary to change the reference voltage of the phase null detector 13.

It will be readily see that the servo control system of FIG. 1, that is, vernier frequency control 16 including components 13, 14, and 15, together with frequency determining components 11, can only provide a vernier adjustment of the output frequency. The success of the combination in adjusting the output frequency to correspond to the desired variation of frequency with time is thus heavily dependent upon the accuracy of frequency scheduler 12 if very large frequency ranges are to be covered and especially if frequency variations according to polynomial functions of time of orders higher than first order are desired. In particular, in the embodiment of FIG. 1 the total phase error of the output of the oscillator cannot exceed one-half cycle within any one of the testing periods. If a greater phase error actually occurs, it will appear to phase null detector 13 to be a lesser phase error and perhaps even to be an error of the opposite polarity from that which it actually is.

Figure 3:
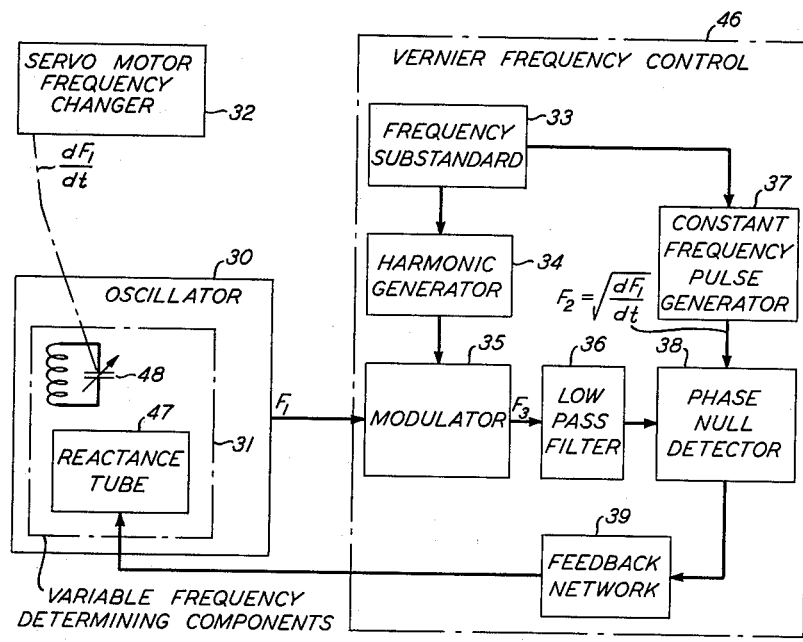
FIG. 3 is a block diagrammatic illustration of the components of a servo control system in accordance with a more complex embodiment of the invention which serves to divide the frequency range into segments of equal frequency variation.
Figure 4:
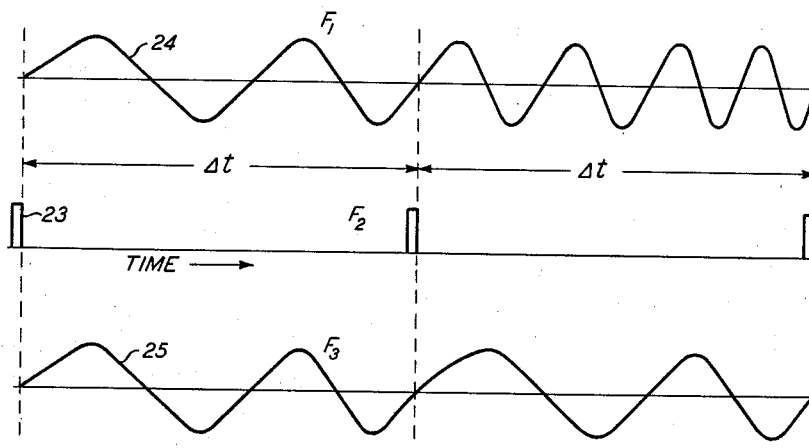
FIG. 4 shows curves which are useful in explaining the theory of operation of the embodiment illustrated in FIG. 3.

Thus, in practical applications, it may be desirable to avoid the very exacting requirements thus imposed on frequency scheduler 12 by breaking the frequency range into several more manageable segments. One way of doing this is shown in the embodiment of FIG. 3. Variable frequency oscillator 30 is the same as disclosed for oscillator 10 of FIG. 1. Frequency determining components 31 and frequency scheduler 32 are also the same as disclosed for components 11 and 12, respectively, of FIG. 1. Frequency substandard 33 produces a basic frequency equal to, or some multiple of, the frequency of the desired timer pulses and thus can be used to energize a constant frequency pulse generator 37. Another portion of the output of frequency substandard 33 is fed to harmonic generator 34 where as many harmonics as desired for a given frequency range can be produced and selected. The fundamental and the selected harmonics must all simultaneously exhibit reference phase at times separated by equal time intervals like those separating reference phase of the output of oscillator 30. This condition is easily satisfied if frequency substandard 33 is used to energize constant frequency pulse generator 37. The output of harmonic generator 34 is then used to modulate the output of oscillator 30 in modulator 35. Components 33, 34, and 35 are standard types well known in the art. The output of modulator 35, as will be readily apparent, contains all of the difference frequencies produced by the modulation of the various harmonics by the output frequency. By passing the output of modulator 35 through low pass filter 36, only the lowest difference frequency F3 may be allowed to pass farther. Since this lowest difference frequency from time to time results from the modulation of the output frequency with a different harmonic frequency, the resulting wave will be similar to that shown in curve 25 of FIG. 4 although it is not necessary that a shift occur at every testing time. In other words, it will appear at the output of low pass filter 36 that the same frequency variation is being repeated from time to time so that phase errors which occur in the oscillator output wave are unlikely to exceed one-half cycle of the difference frequency wave regardless of the total frequency range covered by oscillator 30. In particular, since a much lower number of cycles occurs at the input of phase null detector 38 during a testing period than would have occurred if the output of oscillator 30, as illustrated in curve 24 of FIG. 4, were present at that point, a phase error of magnitude greater than one-half cycle of the output of oscillator 30 will now appear to be an error of a small part of one cycle of the output of low pass filter 36. Thus, although polarity of the output of oscillator 30 with respect to the reference amplitude may be relatively unpredictable for large phase errors, the polarity of the output of low pass filter 36 with respect to the reference amplitude will be more likely to be of the same polarity for deviations of the frequency of oscillator 30 from the prescribed variation in a certain direction. The output of low pass filter 36 and the output of pulse timer 37 are now applied to phase null detector 38, and the operation of the latter and feedback network 39 is identical to the operation disclosed above for phase null detector 13 and feedback network 15 of the embodiment of FIG. 1.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A frequency-controlled oscillator system, comprising means for producing oscillations, said oscillation producing means including variable frequency determining components, frequency changing means connected to at least one of said frequency-determining components and adapted for changing the frequency of said oscillations approximately at a desired rate, and means for providing a vernier control of the frequency of said oscillations, said vernier control means comprising a source of pulses occurring at a constant frequency equal to the square root of an integral submultiple of said desired rate, a phase null detector having a first input coupled with said oscillation producing means and a second input connected to said pulse source, said detector being responsive to said pulses from said source to produce an output signal directly related to the phase of said produced oscillations at the occurrence of each of said pulses, and a feedback network having an input connected to said detector to receive said detector output signal and having an output connected to at least one of said frequency-determining components in a polarity for reducing variations in said phase responsive signal.

2. A system according to claim 1 in which the vernier frequency control means includes a constant frequency generator synchronously coupled with the pulse source, a harmonic generator connected to said constant frequency generator for generating harmonics of said constant frequency, modulating means coupled to oscillation producing means and said harmonic generator for modulating the produced oscillations with said harmonics, and filtering means coupled between said modulating means and the first input of the phase null detector for transmitting the modulation product having the lowest frequency to said first input of said detector.

References Cited in the file of this patent

UNITED STATES PATENTS 2,732,496    Slonczewski _____ Jan. 24, 1956

FOREIGN PATENTS 782,878    Great Britain _____ Sept. 11, 1957

OTHER REFERENCES

Philips Technical Review, vol. 14, No. 5, November 1952, pages 130–140, "The Impulse Governed Oscillator, a System for Frequency Stabilization," Hugenholtz (only pages 133 and 134 relied upon).